United States Patent
De Vos et al.

(10) Patent No.: US 8,362,192 B2
(45) Date of Patent: Jan. 29, 2013

(54) LARGE SCALE PROCESS FOR POLYMERIZATION OF DAPBI-CONTAINING POLYARAMID

(75) Inventors: Richard Elena Theodorus Petrus De Vos, Arnhem (NL); Joannes Marinus Surquin, Arnhem (NL); Marlieke Elisabeth Josephine Pepels, Nijmegen (NL)

(73) Assignee: Teijin Aramid B.V., Arnhem (NL)

( * ) Notice: Subject to any disclaimer, the term of this patent is extended or adjusted under 35 U.S.C. 154(b) by 46 days.

(21) Appl. No.: 12/937,849

(22) PCT Filed: Apr. 9, 2009

(86) PCT No.: PCT/EP2009/054277
§ 371 (c)(1),
(2), (4) Date: Oct. 14, 2010

(87) PCT Pub. No.: WO2009/127586
PCT Pub. Date: Oct. 22, 2009

(65) Prior Publication Data
US 2011/0046340 A1    Feb. 24, 2011

(30) Foreign Application Priority Data
Apr. 18, 2008    (EP) .................................... 08007566

(51) Int. Cl.
*C08G 69/28* (2006.01)
*C08G 69/32* (2006.01)
*C08G 73/18* (2006.01)
*C08G 69/48* (2006.01)

(52) U.S. Cl. ......... 528/336; 528/348; 528/371; 528/372

(58) Field of Classification Search .................. 528/348, 528/336
See application file for complete search history.

(56) References Cited

U.S. PATENT DOCUMENTS

| 4,172,938 A | 10/1979 | Mera et al. | |
|---|---|---|---|
| 5,292,856 A | 3/1994 | Irwin | |
| 5,726,275 A * | 3/1998 | Bannenberg-Wiggers et al. | 528/208 |
| 2007/0083032 A1* | 4/2007 | Bos | 528/310 |

FOREIGN PATENT DOCUMENTS

| EP | 0 743 964 B1 | 5/1998 |
|---|---|---|
| WO | WO 2005/054337 A1 | 6/2005 |

OTHER PUBLICATIONS

"Injection Molding to Polysulfides," *Encyclopedia of Polymer Science and Technology*, vol. 3, pp. 564-576, 2003, Wiley-Interscience, A John Wiley & Sons Publication.
Written Opinion of International Searching Authority dated Jun. 30, 2009 in International Application No. PCT/EP2009/054277.
International Search Report dated Jun. 30, 2009 in International Application No. PCT/EP2009/054277.

* cited by examiner

*Primary Examiner* — Randy Gulakowski
*Assistant Examiner* — Rachel Kahn
(74) *Attorney, Agent, or Firm* — Oliff & Berridge, PLC

(57) ABSTRACT

A method for obtaining an aromatic polyamide crumb from an aromatic diamine and an aromatic diacid chloride, which aromatic polyamide comprises 5(6)-amino-2-(p-aminophenyl)benzimidazole terephthalamide units and has a relative viscosity $\eta_{rel}$ of at least 3, by: (1) adding at least monomers (i)-(iii) in N-methyl pyrrolidone as solvent wherein (i) is 0-30 mole % para-phenylenediamine (PPD), (ii) is 20-50 mole % 5(6)-amino-2-(p-aminophenyl)benzimidazole (DABPI), (iii) is 49.05-50.05 mole % terephthaloyl dichloride (TDC), and optionally calcium chloride to obtain a $CaCl_2$/aromatic diamine molar ratio less than 0.5, and an aromatic diamine/aromatic diacid chloride ratio between 0.99 and 1.01; (2) mixing the monomers and the optional calcium chloride to a homogenous mixture having a monomer concentration of 5 to 12 wt %; followed by (3) adding calcium chloride to the homogeneous mixture to obtain a $CaCl_2$/aromatic diamine molar ratio 0.6-1.0; and (4) polymerizing the mixture.

7 Claims, No Drawings

LARGE SCALE PROCESS FOR POLYMERIZATION OF DAPBI-CONTAINING POLYARAMID

BACKGROUND

The invention relates to a method for obtaining a composition in the form of a crumb comprising an aromatic polyamide from an aromatic diamine and an aromatic diacid chloride, which aromatic polyamide comprises 5(6)-amino-2-(p-aminophenyl) benzimidazole terephthalamide units and has a relative viscosity $\eta_{rel}$ of at least 3 by copolymerizing 5(6)-amino-2-(p-aminophenyl)benzimidazole (DAPBI) and optionally para-phenylenediamine (PPD), and terephthaloyl dichloride (TDC) in a mixture of N-methyl pyrrolidone (NMP) and calcium chloride.

A method of adding calcium chloride to a solvent in a polymerization mixture or after the start of the polymerization process is known from U.S. Pat. No. 4,172,938. This reference discloses in example 34 the polymerization of a PPD/DABPI/TDC mixture. However, according to this reference all of the calcium chloride was added in the NMP solvent prior to adding the monomers. Further a low DABPI content (10 mole %) polymer was made. This process did not lead to the forming of a crumb, but only a paste-like product was obtained. This reference does further not give any hint that all calcium chloride can be added after having added the monomers to the solution, and when part of the calcium chloride is added after the start of the polymerization process, the $CaCl_2$/aromatic diamine molar ratio must become 0.6-1.0 to obtain crumb.

A method for performing such polymerization reaction but obtaining a composition in the form of a crumb or a crumb-like material was disclosed in WO 2005/054337. According to this method the monomer of interest, DAPBI (5(6)-amino-2-(p-aminophenyl)-benzimidazole), is added to the aromatic diamine mixture with the objective to obtain a suitable polymer solution right after polymerization with e.g. PPD and TDC, which can be directly shaped into fibers or films, whereby DAPBI is seen as a suitable co-monomer to keep the aramid polymer in solution. It was found that by selecting a specific molar ratio of PPD, DAPBI, and $CaCl_2$ the formation of powders, paste, dough, and the like could be prevented. Said method therefore pertains to a method for obtaining an aromatic polyamide comprising 5(6)-amino-2-(p-aminophenyl)benzimidazole terephthalamide units as a crumb with a relative viscosity $\eta_{rel}$ of at least 4.

This method, wherein the monomers are added to the final solvent system ($CaCl_2$/NMP) is very suitable for obtaining crumbs and crumb-like materials when performed at the scale as indicated in this patent application, i.e. in a small reaction flask of 2 L.

Unfortunately, it appeared that this method failed when the process was scaled-up. Thus under commercial production conditions in a reactor having a capacity of larger than 50 L, such as in a Drais reactor of 160 L, no crumbs were formed and the material was obtained as a big lump sticking around the stirrer, which was not suitable for further processing. It is therefore an object of the invention to provide a method that is suitable for large scale production for obtaining aramid polymer having DAPBI units with a high relative viscosity and a suitable material consistency. The method of course can also be used for small-scale production of aramid polymer having DAPBI units. When used for such small-scale polymerization reactions the method of the invention can be considered an alternative for the method of WO 2005/054337, wherein the solvent is added prior to polymerization.

SUMMARY

To this end a method was found that relieved the problems of the prior art method. Thus the invention pertains now to a method for obtaining an aromatic polyamide crumb from an aromatic diamine and an aromatic diacid chloride, which aromatic polyamide comprises 5(6)-amino-2-(p-aminophenyl)benzimidazole terephthalamide units and has a relative viscosity $\eta_{rel}$ of at least 3, by
- adding at least monomers (i)-(iii) in N-methyl pyrrolidone as solvent wherein:
  - i) is 0-30 mole % para-phenylenediamine (PPD);
  - ii) is 20-50 mole % 5(6)-amino-2-(p-aminophenyl)benzimidazole (DABPI);
  - iii) is 49.05-50.05 mole % terephthaloyl dichloride (TDC); and optionally calcium chloride to obtain a $CaCl_2$/aromatic diamine molar ratio less than 0.5, and an aromatic diamine/aromatic diacid chloride ratio between 0.99 and 1.01;
- mixing the monomers and the optional calcium chloride to a homogeneous mixture having a monomer concentration of 5 to 12 wt %, followed by
- adding calcium chloride to the homogeneous mixture to obtain a $CaCl_2$/aromatic diamine molar ratio 0.6-1.0; and
- polymerizing the mixture.

DETAILED DESCRIPTION OF EMBODIMENTS

The thus obtained crumb material after coagulation and washing with water followed by optionally drying is suitable for making a spin dope by dissolving it in a solvent, for instance sulfuric acid, NMP, NMP/$CaCl_2$, N-methyl acetamide, and the like. The dope can be used to manufacture formed articles, such as fibers, films, and the like.

The term crumb or crumb-like as used in this invention means that the polymer in the mixture after polymerization is fully or substantially fully in the form of breakable clumps or particles, which are not sticky (i.e. do not form a lump around stirrer), and have a mean particle size greater than 100 µm, usually greater than 1 mm. See also the definition of crumbs for PPTA aramid in Encyclopedia of Polymer Science and Technology, Vol. 3, page 565 (John Wiley & Sons) wherein PPTA crumbs are defined as particles with the consistency of wet sawdust.

According to a preferred embodiment of the invention the $CaCl_2$/aromatic diamine molar ratio in the homogeneous mixture is 0.6-1.0, preferably 0.70-0.80.

It is essential that the amount of calcium chloride reaches the claimed molar ratio after the monomers have been homogenized in the solvent. However, small amounts of calcium chloride may be added prior to or during mixing the monomers before being homogenized, for instance one or more of the monomers can be added to the solvent NMP (N-methyl pyrrolidone) and calcium chloride, as long as the molar ratio $CaCl_2$/aromatic diamine is less than 0.5, i.e. between 0 and 0.5. The remainder of the calcium chloride to obtain a ratio between 0.6 and 1.0 is then added after the monomers have been homogenized in the solvent, preferably as a mixture of calcium chloride and NMP. In a preferred embodiment, no calcium chloride is present in the solvent to dissolve the monomers and the calcium chloride is only added to the homogeneous mixture, preferably as NMP/$CaCl_2$ mixture. This method of adding calcium chloride is quite unusual because the NMP/$CaCl_2$ mixture is the solvent (i.e. $CaCl_2$ adds to the dissolving power of NMP) and an activator for the polymerization reaction. There is no obvious reason or expectation that the reaction would render a different product if the calcium chloride is added in a later phase of the process, i.e.

that it renders a crumb whereas no crumb is formed when the calcium chloride is immediately added at the start of the polymerization reaction.

Thus embodiments of the invention are first mixing the aromatic diamines including DABPI in N-methyl pyrrolidone to a $CaCl_2$/aromatic diamine molar ratio of 0, for 1 to 180 min, preferably for 3-30 min, after which TDC is added and mixed for another 1 to 180 min, preferably for 3-30 min, followed by adding calcium chloride to obtain a $CaCl_2$/aromatic diamine molar ratio 0.6-1.0.

The monomer concentration in the solvent should be 5 to 12 wt % in order to obtain crumbs. The optimum concentration depends on the DABPI content of the monomer mixture, but can easily be determined by the artisan. As a rule of thumb, the higher the DABPI content, the lower the monomer concentration in the solvent.

The aromatic diamines include DABPI. Optionally up to 30 mole % PPD is added as another monomer, but aromatic diamine monomers such as para-chlorophenylene-diamine (Cl-PPD) and para-methylphenylenediamine (Me-PPD) may also be added.

The aromatic diacid chloride include TDC, but small amounts (up to 1.2 mole %) of other aromatic diacid chlorides may be present.

The term "mole %" relates to the molar percentage of the monomers with regard to the total of aromatic diamine and aromatic diacid chloride monomers.

The terms "homogeneous mixture" and "homogenized" mean that the monomers are homogeneously distributed in the solvent as a solution, emulsion, or suspension.

When the monomers are homogenized calcium chloride is added to obtain the required molar ratio. Calcium chloride can be added as such or as a mixture, dispersion or solution, such as in the form of an $NMP/CaCl_2$ mixture.

The method is particularly suitable for commercial large scale production of polymer as a crumb. Said large scale processes are usually performed in reactors of a capacity of at least 50 L, usually much bigger, for instance in reactors of 2500 L to 10.000 L, such as disclosed in EP 0743964.

The method is particularly suitable for use in a cylindrical reactor having a measure capacity of at least 50 L which is equipped with a single mixing gear used as stirrer and granulator, such as is the case for the Turbulent-Schnellmischer mit Flügelmischwerk of Drais. The method can also be used in a continuous process.

Several batches of polyaramid with 20-50 mol % DAPBI were prepared in a 160 L and 2500 L Drais reactor and showed good reproducibility. Copolymers with relative viscosities above 4 were found to be suitable for spinning yarns.

Generally the process of the invention comprises the steps:
Adding solvent NMP in the reactor;
Adding PPD and DAPBI (and mixing from 1 to 180 min, preferably 3-30 min);
Cooling to about 5° C.;
Adding TDC (and mixing from 1 to 180 min, preferably 3-30 min);
Adding $NMP/CaCl_2$ (to a $CaCl_2$/(PPD+DAPBI) molar ratio 0.6-1.0, preferably 0.70-0.80).
After about 15 minutes to 2 hours the polymer obtained has a $\eta_{rel}$ of at least 3.

In the following experiments, the aspects of the invention are exemplified.

EXAMPLES

General Polymerization Procedure
Materials:
DAPBI, 5(6)-amino-2-(p-aminophenyl)benzimidazole, melting point=235° C., purity>99.9%
PPD (p-phenylenediamine), melting point=140° C., purity>99.9%, ex Teijin Aramid
TDC (terephthaloyl dichloride), melting point=80 ° C., purity>99.9%, ex Teijin Aramid
$NMP/CaCl_2$ and NMP (water content<200 ppm), ex Teijin Aramid Standard Teijin Aramid (Twaron®) polymerization methods for making a copolymer with 20-50 mole % DAPBI containing an overall copolymer composition of 50 mole % TDC, 15-35 mole % PPD and 35-15 mole % DAPBI.

After polymerization the formed reaction product was coagulated, washed with demineralized water and dried in a fluid bed dryer (at 150° C.).

Indicative for the quality of the formed polyaramid with DAPBI units is the relative viscosity ($\eta_{rel}$). The relative viscosity is defined as the viscosity ratio of a 0.25 wt % polyaramid solution in 96% $H_2SO_4$ to the polymer-free solvent (96% $H_2SO_4$). This ratio is determined with a capillary viscometer (Ubelohde) at 25° C.

Results

Example 1

Preparation of Polyaramid with 35 mole % DAPBI Units
NMP and the amines (PPD and DAPBI) were mixed in a horizontal cylindrical paddle mixer of Drais having a measure capacity of 160 liter for 30 min and the mixture was cooled to a temperature of 5° C. and TDC was added. After cooling the mixture to 5° C., $NMP/CaCl_2$ was added to obtain a $CaCl_2$/(PPD+DAPBI) molar ratio of 0.72. After one hour of reaction time the reaction product consisting of small crumb-like particles with a relative viscosity of 13.6, was obtained. Polymerization without $CaCl_2$ in the solvent resulted in PPTA-DAPBI powder with $\eta_{rel}$ of maximum 1.2 (comparison; Table 1).

Example 2

Polyaramid was prepared according to the method of Example 1, using 25 mole % rather than 35 mole % DAPBI units.

As comparison prior art examples for making aramid copolymers were performed using 25 and 35 mole % DAPBI and various monomer concentrations according to the method of WO 2005/054337.

Table 1 shows that the examples of the invention render crumbs, whereas the prior art method leads to lumps that stuck around the stirrer.

Example 3

Polyaramid with 25 mole % DAPBI units was prepared in a 'Turbulent-Schnellmischer mit Flügelmischwerk' Drais reactor with a measure capacity of 2500 L.

To 897 L of NMP were added 11.99 Kg of PPD and 24.87 Kg of DAPBI and this was mixed for 60 minutes. Subsequently, the mixture was cooled to 5° C. and 45.08 Kg of TDC (solid) were added and mixed for 66 minutes at 50 RPM. To the mixture 145L of $NMP/CaCl_2$ (with 10.2 wt % $CaCl_2$) were added and the reaction proceeded at a stirrer speed of 160 RPM for 125 minutes. The crumb-like reaction product was coagulated and washed with demineralized water. After drying the relative viscosity of the resulting DAPBI copolymer was 5.1.

Example 4

Preparation of Polyaramid with 25 mole % DAPBI Units
$NMP/CaCl_2$ and the amines (PPD and DAPBI) with a $CaCl_2$/(PPD+DAPBI) molar ratio of 0.30 were mixed in a horizontal cylindrical paddle mixer of Drais having a measure capacity of 160 liter for 30 min and the mixture was cooled to a temperature of 5° C. and TDC was added. After cooling the mixture to 5° C., NMP/CaCl$_2$ was added to obtain a CaCl$_2$/(PPD+DAPBI) molar ratio of 0.71. After one hour of reaction time the reaction product consisting of small crumb-like particles with a relative viscosity of 7.1, was obtained.

TABLE 1

Formulations of charges

| Ex | Method | Mole % DAPBI | molar ratio CaCl$_2$/(PPD + DAPBI) | Monomers (wt %) | $\eta_{rel}$ | Consistency Reaction product |
|---|---|---|---|---|---|---|
|  | comparison | 35 | 0 | 6.2 | 1.2 | powder |
|  | prior art* | 35 | 0.76 | 12.4 | 4.2 | lump around stirrer |
|  | prior art* | 35 | 0.77 | 6.2 | 6.3 | lump around stirrer |
|  | prior art* | 25 | 0.76 | 7.2 | 6.2 | lump around stirrer |
| 1 | invention | 35 | 0.72 | 6.2 | 13.6 | Crumbs |
| 2 | invention | 25 | 0.76 | 7.2 | 5.3 | Crumbs |
| 3 | invention | 25 | 0.70 | 7.0 | 5.1 | Crumbs |
| 4 | invention | 25 | 0.71 | 7.3 | 7.1 | Crumbs |

*Method according to WO 2005/054337 wherein the solvent NMP/Cl$_2$ was added prior to polymerization

The invention claimed is:

1. A method for obtaining an aromatic polyamide crumb from an aromatic diamine and an aromatic diacid chloride, which aromatic polyamide comprises 5(6)-amino-2-(p-aminophenyl)benzimidazole terephthalamide units and has a relative viscosity $\eta_{rel}$ of at least 3, comprising:
   adding at least monomers (i)-(iii) in N-methyl pyrrolidone as solvent wherein:
   i) is 0-30 mole % para-phenylenediamine (PPD);
   ii) is 20-50 mole % 5(6)-amino-2-(p-aminophenyl)benzimidazole (DABPI);
   iii) is 49.05-50.05 mole % terephthaloyl dichloride (TDC); and optionally calcium chloride to obtain a CaCl$_2$/aromatic diamine molar ratio less than 0.5, and an aromatic diamine/aromatic diacid chloride ratio between 0.99 and 1.01;
   mixing the monomers and the optional calcium chloride to a homogeneous mixture having a monomer concentration of 5 to 12 wt %, followed by
   adding calcium chloride to the homogeneous mixture to obtain a CaCl$_2$/aromatic diamine molar ratio of 0.6-1.0; and
   polymerizing the mixture in a reactor having a measure capacity of at least 160 L, wherein mole % relates to the molar percentage of the monomers with regard to the total of aromatic diamine and aromatic diacid chloride monomers.

2. The method according to claim 1 wherein the CaCl$_2$/aromatic diamine molar ratio in the homogeneous mixture is 0.65-0.85.

3. The method according to claim 2 wherein the CaCl$_2$/aromatic diamine molar ratio in the homogeneous mixture is 0.70-0.80.

4. The method according to claim 1 wherein first the aromatic diamines are mixed for 1 to 180 min in N-methyl pyrrolidone wherein the CaCl$_2$/aromatic diamine molar ratio is 0, after which the aromatic diacid chlorides are added and mixed for another 1 to 180 min followed by adding calcium chloride to obtain a CaCl$_2$/aromatic diamine molar ratio 0.6-1.0.

5. The method according to claim 1 wherein calcium chloride is added as an NMP/CaCl$_2$ mixture.

6. The method according to claim 1 which is performed in a cylindrical reactor having a measure capacity of at least 160 L, which is equipped with a single mixing gear for use as stirrer and granulator.

7. The method according to claim 1, wherein first the aromatic diamines are mixed for 3-30 min in N-methyl pyrrolidone wherein the CaCl$_2$/aromatic diamine molar ratio is 0, after which the aromatic diacid chlorides are added and mixed for another 3-30 min, followed by adding calcium chloride to obtain a CaCl$_2$/aromatic diamine molar ratio of 0.6-1.0.

* * * * *